United States Patent
Levy

(10) Patent No.: US 9,573,100 B2
(45) Date of Patent: Feb. 21, 2017

(54) COMPACT DISPENSER FOR CHEMICALS AND OTHER CONCENTRATED LIQUIDS

(71) Applicant: Amram Levy, Aventura, FL (US)

(72) Inventor: Amram Levy, Aventura, FL (US)

(73) Assignee: Amram Levy, Aventura, FL (US)

( * ) Notice: Subject to any disclaimer, the term of this patent is extended or adjusted under 35 U.S.C. 154(b) by 0 days.

(21) Appl. No.: 15/088,635

(22) Filed: Apr. 1, 2016

(65) Prior Publication Data
US 2016/0361731 A1 Dec. 15, 2016

Related U.S. Application Data

(60) Provisional application No. 62/174,073, filed on Jun. 11, 2015.

(51) Int. Cl.
*B01F 5/04* (2006.01)
*B67D 7/74* (2010.01)
*B01F 3/08* (2006.01)

(52) U.S. Cl.
CPC .......... *B01F 5/0413* (2013.01); *B01F 5/0495* (2013.01); *B67D 7/74* (2013.01); *B67D 7/741* (2013.01); *B01F 2003/0896* (2013.01); *B01F 2215/004* (2013.01)

(58) Field of Classification Search
CPC ..... B01F 5/0413; B01F 5/0495; B01F 5/0496; B01F 2215/004; B01F 2003/0896; B67D 7/74; B67D 7/741
USPC ...................................... 366/163.2
See application file for complete search history.

(56) References Cited

U.S. PATENT DOCUMENTS

| 3,333,601 | A | * | 8/1967 | Lofgreen | B01F 5/04 137/607 |
| 4,218,013 | A | * | 8/1980 | Davison | B05B 7/12 137/889 |
| 6,293,294 | B1 | * | 9/2001 | Loeb | B01F 5/0405 137/1 |
| 6,883,560 | B2 | * | 4/2005 | Beldham | B65B 3/22 141/100 |
| 8,631,824 | B2 | * | 1/2014 | Pelkey | A47L 15/4418 134/36 |
| 2007/0028980 | A1 | * | 2/2007 | Lohr | B01F 5/0413 137/889 |
| 2007/0034644 | A1 | * | 2/2007 | Bertucci | B01F 3/0865 141/100 |

* cited by examiner

*Primary Examiner* — Daniel J Colilla

(57) ABSTRACT

Compact dispenser for chemicals and other concentrated liquid is disclosed. The dispenser is compact and with is attractive design you can use it anywhere from home to office, restaurants, cafe', etc.

5 Claims, 5 Drawing Sheets

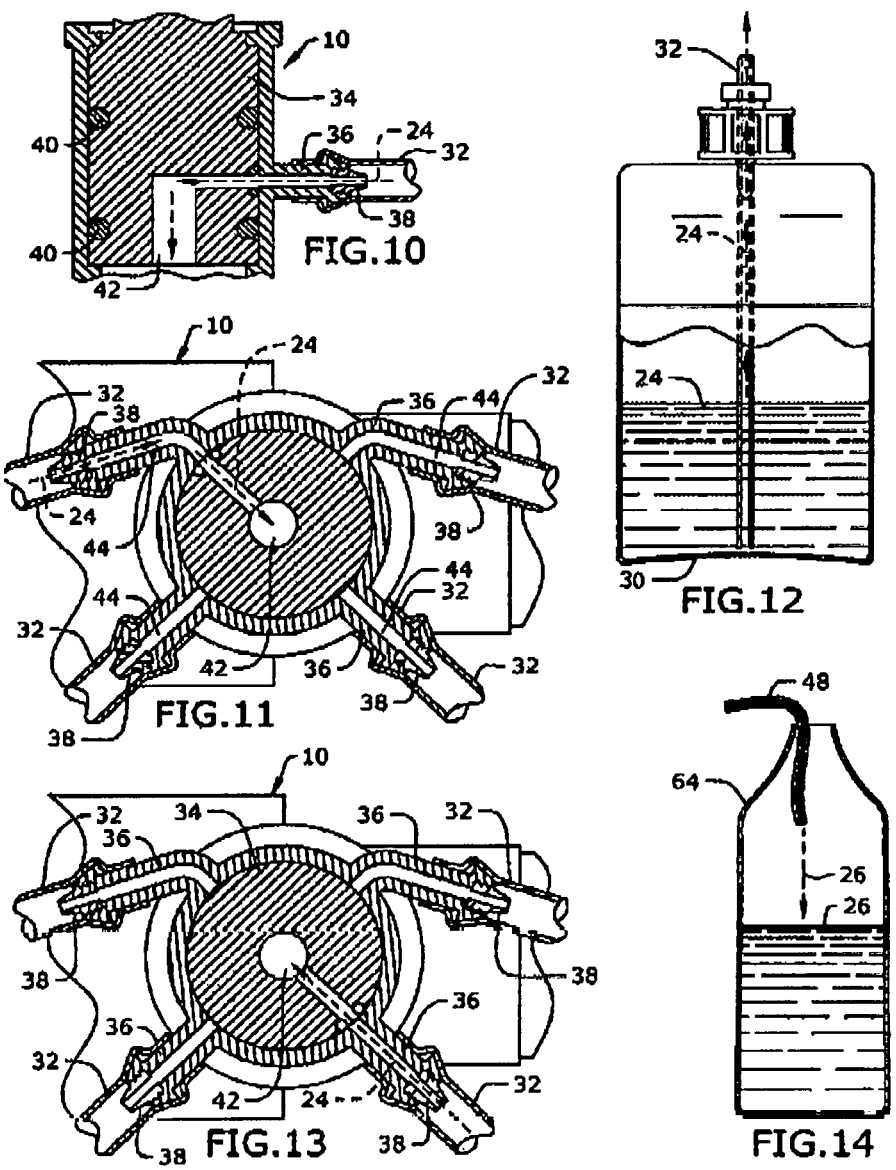

COMPACT DISPENSER FOR CHEMICALS AND OTHER CONCENTRATED LIQUIDS

CROSS-REFERENCE TO RELATED APPLICATIONS

The present application relates and claims priority to U.S. provisional patent application No. 62/174,073 filed on Jun. 11, 2015.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present invention relates in general to the cleaning tools.

Description of the Related Art

Our planet is reaching a critical tipping point of deterioration due to high pollution levels caused by global population, over the years we have been concerned about consuming products without thinking about the negative consequences that leave non-degradable plastic containers and packaging of products we consume. The cleaning area is not immune to contribute massively to the pollution of our environment, which is why the present invention (Greenspenser) is an innovative solution that helps us to collaborate with the preservation of our planet.

Imagine how many containers of cleaning products we have thrown away again and again, would find a fairly high number, which surely would make us reflect, if we add the products of our family, friends, neighbors, our city, our continent, industrial companies, this figure will make us faint. The important point at this time is not what we did in the past, But what is needed from now on for the conservation of our planet Earth, and therefore the life of future generations, we must change our mentality selfless to a green mentality, the present invention is dispensing super concentrated certified green cleaning products very easy to use, aesthetically designed and can become the starting point for new ecological culture in our homes, offices, shops restaurants, hotels and businesses in general. This dispenser allow us the opportunity to use a green cleaning solutions of high quality that leave us with cleanness and nice fragrance, and most importantly eliminate the waste of plastic containers and hazardous waste, as we know it takes years to decompose in nature and landfill. The present invention understands the cost sensitive nature of the proportioning market, and the important part that a dispenser plays in delivering the correct amount of chemical. The present invention has designed an elegantly simplistic proportioner that delivers chemical accurately and at an economical price. This compact, durable dispenser is designed with minimal number of parts, nonmoving parts which making servicing and operation simple. Can easily be introduced into our homes and businesses, create environmental awareness is the task of each and every one of us. The present invention consider an innovative solution is practical and functional, the characteristics of not only individuals but provide global benefits, and today is a good day to decide to make significant contributions to our planet and that together we can stop pollution.

BRIEF SUMMARY OF THE INVENTION

The present invention has designed an elegantly simplistic proportioner that delivers chemical accurately and at an economical price. This compact, durable dispenser is designed with minimal number of parts, nonmoving parts which making servicing and operation simple. Can easily be introduced into our homes and businesses, create environmental awareness is the task of each and every one of us. The present invention consider an innovative solution is practical and functional, the characteristics of not only individuals but provide global benefits, and today is a good day to decide to make significant contributions to our planet and that together we can stop pollution.

DESCRIPTION OF THE DRAWINGS

For a more complete understanding of the present invention, reference is now made to the following descriptions:

FIG. 10. Is a sectional detail view of the invention shown in active state.

FIG. 11. Is a sectional detail view of the invention along line 11-11 in FIG. 3. shown in active state.

FIG. 12. Is a sectional detail view of the invention along line 12-12 in FIG. 2 shown in active state.

FIG. 13. Is a sectional detail view of the invention along line 13-13 shown in active state.

FIG. 14. Is a sectional detail view demonstrating filling of bottle component.

REFERENCE NUMERALS IN THE DRAWINGS

Figure 1:
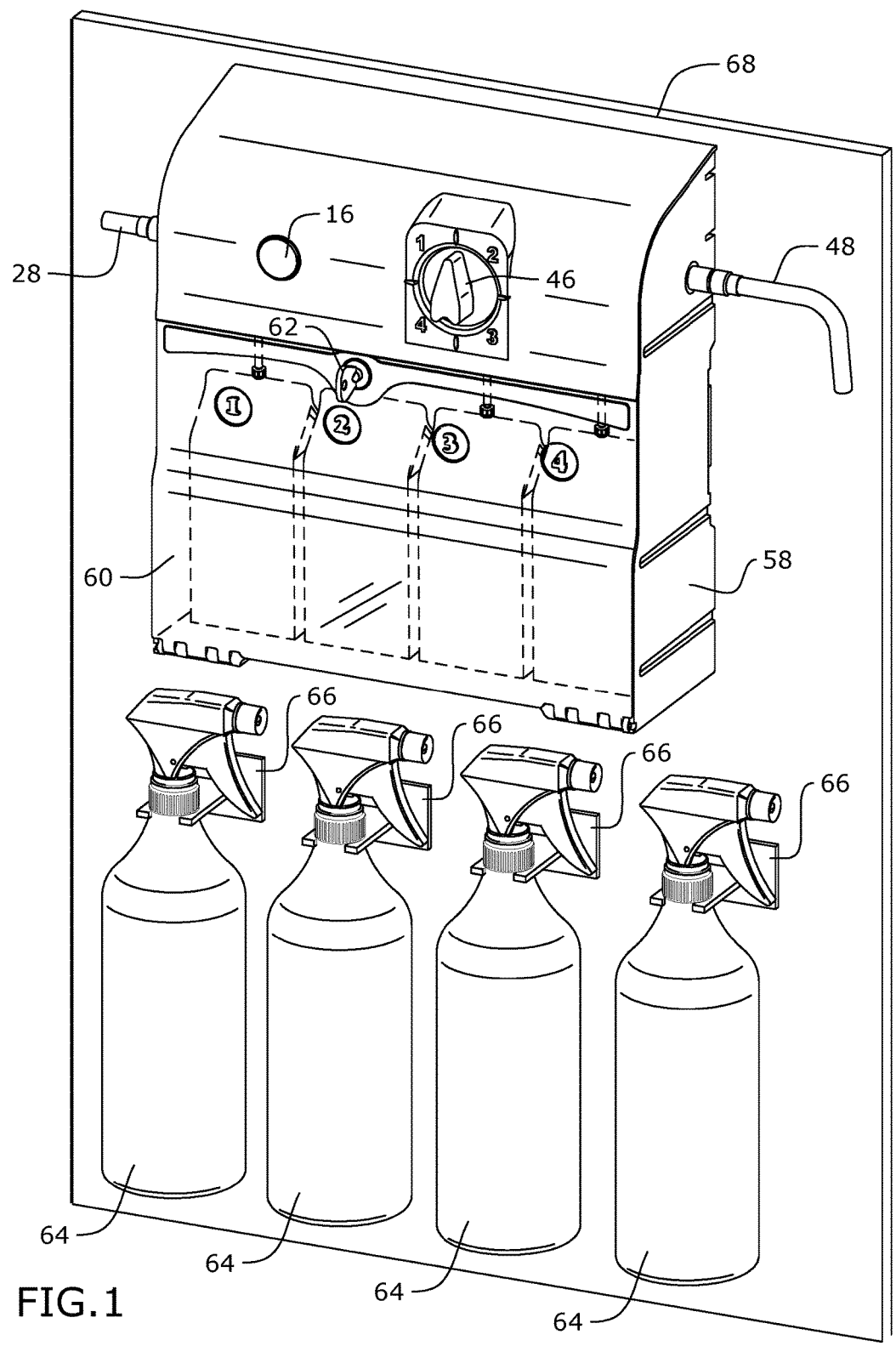
FIG. 1. Is a perspective view of the overall invention.
Figure 2:
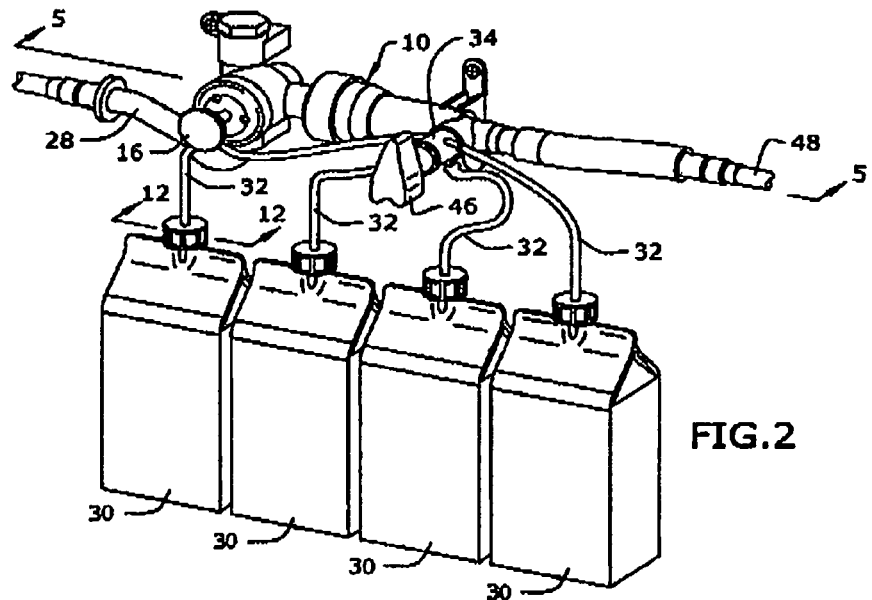
FIG. 2. Is a detail perspective view of the internal component assembly.
Figure 3:
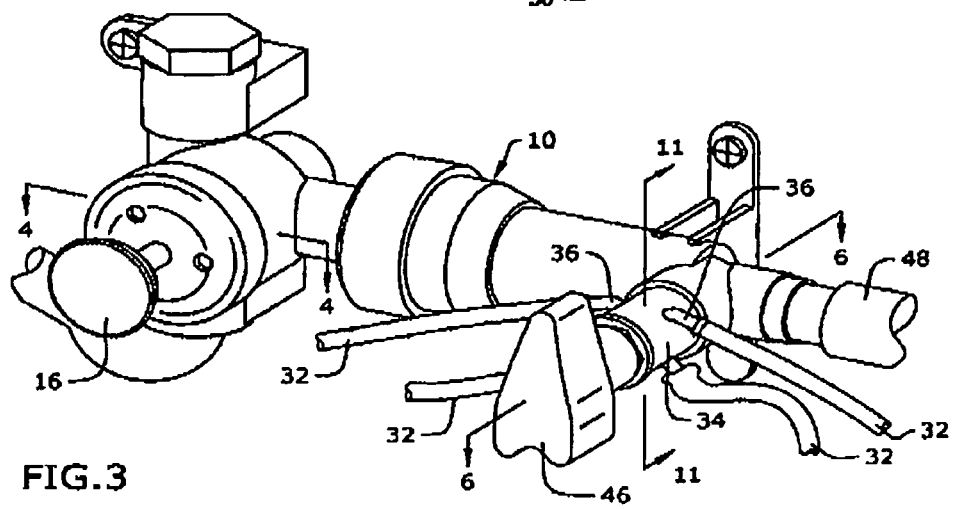
FIG. 3. Is a detail perspective view of the internal component assembly.
Figure 4:
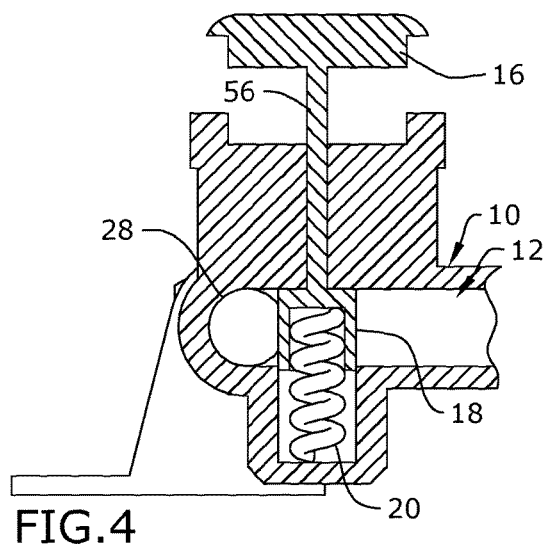
FIG. 4. Is a sectional detail view of the invention along line 4-4 in FIG. 3. shown in inactive state.
Figure 5:
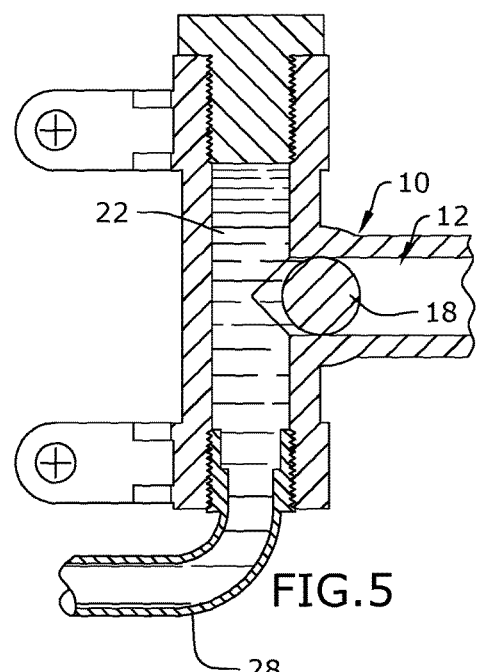
FIG. 5. Is a sectional detail view of the invention along line 5-5 in FIG. 2 shown in inactive state.
Figure 6:
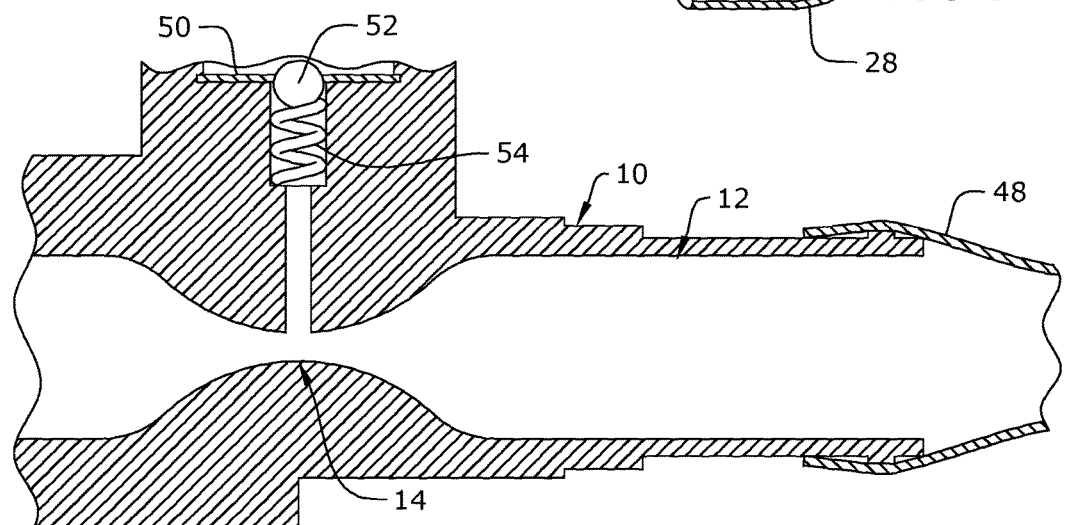
FIG. 6. Is a sectional detail view of the invention along line 6-6 in FIG. 3 shown in inactive state.
Figure 7:
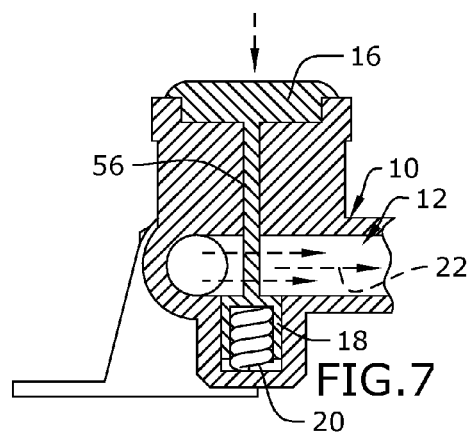
FIG. 7. Is a sectional detail view of the invention shown in active state.
Figure 8:
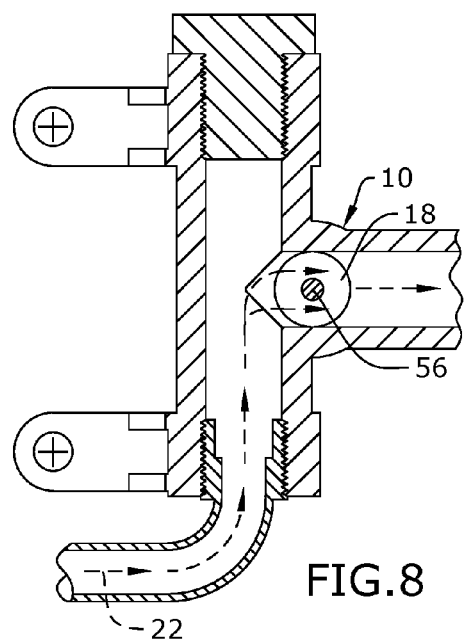
FIG. 8. Is a sectional detail view of the invention shown in active state.
Figure 9:
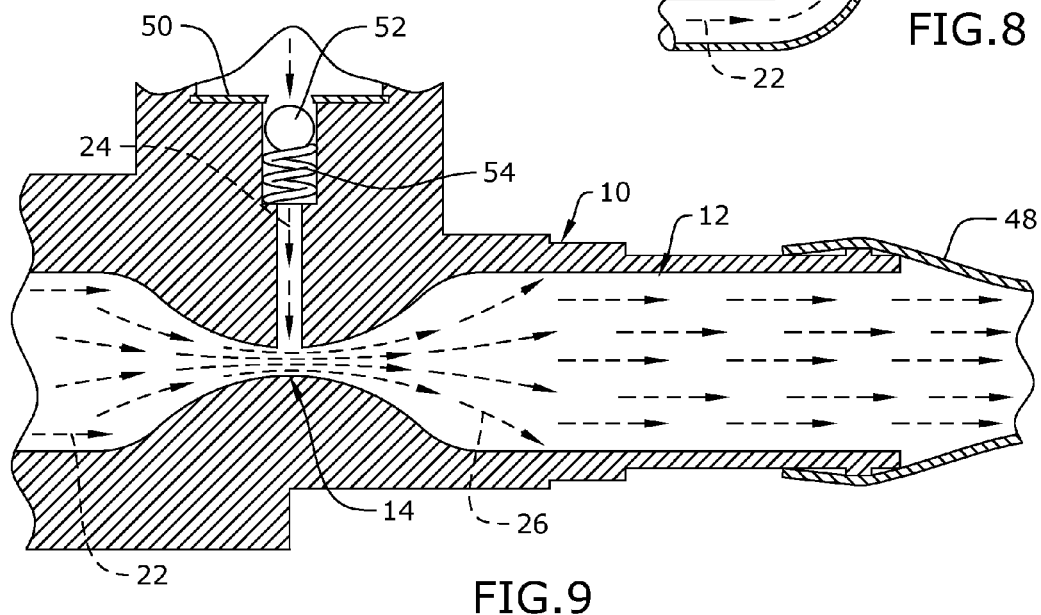
FIG. 9. Is a sectional detail view of the invention shown in active state.

For a more complete understanding of the present invention parts, reference is now made to the following descriptions:

10. is the flow housing.
12. is the inner flow chamber.
14. is the inner flow chamber narrowing region.
16. is the flow activation button.
18. is the flow block piston.
20. is the flow block piston spring.
22. is the water/water flow.
24. is the chemical/chemical flow.
26. is the solution flow.
28. is the intake tubing.

30. are the chemical pouches.
32. are the chemical pouch tubes.
34. is the chemical selection rotator component.
36. are the chemical selection rotator component nozzle protrusions.
38. are the nozzle flow regulators.
40. are the chemical selection rotator component seal.
42. is the chemical selection rotator component fluid shaft.
44. is the chemical selection rotator nozzle fluid shaft.
46. is the rotator knob.
48. is the outflow tubing.
50. is the ball plate.
52. is the valve ball.
54. is the valve spring.
56. is the flow block piston stem.
58. is the housing.
60. is the pouch access door.
62. is the pouch access door key.
64. are the solution bottles.
66. are the solution bottle mounting brackets.
68. is the exemplary mounting surface.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

So we can understand how the invention works we will explain the function of every part. A water line is connected to a pipe that allows water to flow when we press the button valve 16 down and the resistant spring 20 will shut off the valve when button valve 16 is released. Pressing button valve 16 allows water to flow from intake tubing 28 into inner flow chamber 12 by moving flow block piston 18. Then the water flows through the outflow tubing 48 and a product will syphon through the valve spring 54 from one of the chemical pouch tubes 32 that have the concentrate solution 24 (1:128) into the flow housing 10. When the button 16 is released valve spring 54 will bias valve ball 52 into a position that closes fluid communication between the chemical pouch tubes 32 and the flow housing 10. A product is selected with dial 46 which rotates the chemical selection rotator component 34 which positions a radial fluid communication shaft. The radial fluid communication shaft is in fluid communication with the chemical selection rotator component fluid shaft 42 thereby connecting one of the chemical pouch tubes 32 with the fluid shaft 42, the inner flow chamber, and the outflow tubing 48. A bottle 64, with the spray trigger 66 removed, can then be filled with the outflow tubing 48 to the level needed with mixed solution 26. whole system is confined into the box 58, and when opening the door 60 you can see we have 4 clear Poly pouches 32 with ¼" pipes connected to a venturi system 10. By using rotator knob 46 to select a number from 1 to 4 a corresponding desired pouch from 1 to 4 that you can see through the door 60 is selected. When you press the button 16, water will flow through pipe 28 through the venturi 10 and outflow tubing 48 to fill the bottle 64, and when you get the desired level releasing the button 16 will stop the water flow.

How to Make the Invention:

You take the box, which is approximately 12"w×12"h× 4"w place dispensing assy. At the top of the front face, the push button 16 and dial selector 46 to operate the unit are placed in through holes. In the back of the unit top make a hole for main water feed hose and connect. On the dial you place 4 dispensing tips. Connect the special vinyl clear pipes to the special cups and straws supplied. Underneath the cups and straws, the 4 concentrated pouches can be seen through the clear window of the PLEXIGLAS door. Each pouch clearly seen through the PLEXIGLAS door can be identified and seen with one of numbers 1, 2, 3, and 4 marked on the top of each pouch. When everything is connected we select the numbered pouch of choice and press button 16 the for filling of the supplied quart bottles. When a pouch is empty simply open the PLEXIGLAS door and unhook the empty pouch by unscrewing the special cup and straw and remove the empty pouch. Next, insert a new pouch, insert the cup and straw onto the pouch, screw on the cup, and place the pouch back on the hook and close the PLEXIGLAS door shut.

All are necessary. You can install the pouches or any concentrate bottles outside of the box with longer hose and the system can work the same.

How to Use the Invention:

When connecting the main water tube to water source this tube will lead the water to the venturi dispensing mechanism By using the dial, you select the product from any one of the 5 oz or 10 oz concentrated pouches. The pouches are connected with pipes and special cups and straws that leading the siphon concentrated products from the pouches to the pipes through a flex faucet. Fill the quart bottle under the flex faucet and press the start button the water will flow through the system, and at the same time, the water siphons the concentrate through the accurate tip to give the exact portion of the concentrate with water to the quart bottle till it is full and then let the button go. The operation is done. Additionally: it can be used for dispensing concentrate juice and fill juices and drinks. Also, it can create: cleaning products, juices, drinks, and any liquid concentrate.

The invention claimed is:

1. A portable compact proportion fluid dispenser for combining a concentrated product with water and dispensing the resulting mixed solution, comprising:
   a flow housing comprising an inner flow chamber, the inner flow chamber including a narrowing region;
   a selection knob for selecting a concentrated product to mix with water;
   a selector valve connected to the selection knob, the selection valve comprising a central, axial channel and a radial channel in fluid communication with the central, axial channel;
   a valve mechanism located in the flow housing, the valve mechanism including a valve plate located downstream of the selector valve, a valve ball disposed in the valve plate, and a valve spring located downstream of the valve ball;
   a water flow activation button connected to the flow housing, the water flow activation button including a flow block piston located within the inner flow chamber,
   wherein when the water flow activation button is not pressed the flow block piston prevents water from flowing into the inner flow chamber;
   a plurality of tubes connected in fluid communication with the selector valve and each tube in fluid communication with a respective concentrate pouch, each pouch containing a concentrated product; and
   a dispenser nozzle on one end of the portable compact proportion fluid dispenser, wherein the dispenser is coupled to a water supply pipe and the selection knob is set to select one of the plurality of concentrate pouches such that when the water flow activation button is pressed water will flow through the inner flow chamber thereby precipitating a venturi draft siphoning a selected concentrated product through a respective tube and into the narrowing region thereby mixing the water and the selected concentrated product into a solution for dispensing at the dispenser nozzle, and wherein when the water flow activation button is released the valve ball closes the inner flow chamber from fluid communication with the plurality of tubes.

2. The compact proportion fluid dispenser as set forth in claim 1, further comprising a transparent door and wherein said flow housing is formed of opaque plastic for containing said concentrate pouches so that they can been seen behind the door.

3. The compact proportion fluid dispenser as set forth in claim 1 wherein the plurality of tubes are clear and the plurality of concentrate pouches are clear and each of the plurality of tubes are respectively connected to one of the concentrate pouches so that a user can determine the level of liquid remaining in each concentrate pouch through the transparent door.

4. The compact proportion fluid dispenser as set forth in claim 1 wherein the compact proportion dispenser is mounted on the wall for durable and effective use.

5. The compact proportion fluid dispenser as set forth in claim 1, wherein said plurality of concentrate pouches each matingly engage with a respective threaded cup having a straw, each threaded cup being connected to one of the plurality of tubes.

* * * * *